United States Patent [19]
Campos-Loriz

[11] Patent Number: 4,578,363
[45] Date of Patent: Mar. 25, 1986

[54] SILICON CARBIDE REFRACTORIES HAVING MODIFIED SILICON NITRIDE BOND

[75] Inventor: Diego Campos-Loriz, Niagara Falls, N.Y.

[73] Assignee: Kennecott Corporation, Cleveland, Ohio

[21] Appl. No.: 573,076

[22] Filed: Jan. 23, 1984

[51] Int. Cl.⁴ .............................................. C04B 35/56
[52] U.S. Cl. ...................... 501/89; 264/65; 501/92; 501/97
[58] Field of Search ................ 501/89, 92, 97; 264/65

[56] References Cited

U.S. PATENT DOCUMENTS

| | | | |
|---|---|---|---|
| 2,752,258 | 6/1956 | Swentzel | 501/92 |
| 4,154,787 | 5/1979 | Brown | 264/65 |
| 4,230,497 | 10/1980 | Schwetz et al. | 264/65 |
| 4,243,621 | 1/1981 | Mori et al. | 501/89 |
| 4,460,528 | 7/1984 | Petrak et al. | 264/65 |

FOREIGN PATENT DOCUMENTS

| | | | |
|---|---|---|---|
| 0009011 | 1/1977 | Japan | 501/89 |
| 0156379 | 9/1982 | Japan | 501/89 |
| 0088169 | 5/1983 | Japan | 501/97 |
| 0095658 | 6/1983 | Japan | 501/89 |
| 2131411A | 11/1983 | United Kingdom . | |

Primary Examiner—John F. Niebling
Assistant Examiner—Terryence Chapman
Attorney, Agent, or Firm—David M. Ronyak

[57] ABSTRACT

A refractory that is highly resistant to sequential steam oxidation and molten alkali attack is formed by reaction nitriding a mixture of silicon carbide grain, silicon metal and aluminum metal. The refractory is suitable as a blast furnace lining.

17 Claims, No Drawings

SILICON CARBIDE REFRACTORIES HAVING MODIFIED SILICON NITRIDE BOND

This invention relates to bonded silicon carbide material having a modified silicon nitride bond and articles composed thereof. It also pertains to the ingredients, raw batch and method of making such material and articles which are particularly well suited for use in highly alkaline and oxidative environments such as may be found to exist in the iron and steel industry.

Silicon nitride-bonded, silicon carbide has been found to be eminently useful for lining of blast furnaces used in the manufacture of iron from ore. Such silicon nitride-bonded silicon carbide materials exhibit high strength and oxidation resistance and heat shock resistance. However, there remains a need for materials of even greater refractoriness, oxidation and alkali resistance so that the amount of operating time between necessary relining or rebuilding of a blast furnace may be extended thereby greatly reducing the capital expense involved in the manufacture of iron and steel.

The use of silicon nitride as a bonding phase for silicon carbide aggregate is taught in U.S. Pat. No. 2,752,258 the disclosure of which is herein incorporated by reference. In this U.S. Patent there is described a bonded silicon carbide article having granular silicon carbide bonded by silicon nitride in which substantially all of the silicon of the bond is combined with nitrogen as silicon nitride having the chemical formula $Si_3N_4$. According to this reference, the silicon carbide particles are held together by a bonding phase of silicon nitride that is obtained by intimately mixing silicon powder of at least 200 mesh (U.S. Standard Sieve) and finer with moisture to form a moldable mixture, then molding the desired mass or shape from the mixture, drying the thus formed material and firing it in a non-oxidizing, nitrogenous atmosphere at a temperature and period of time sufficient to convert substantially all the silicon metal to silicon nitride. Dry Lignone and bentonite gel (one part dry bentonite to four parts water) are employed as processing aids and temporary binders.

U.S. Pat. No. 2,618,565 describes the manufacture of silicon nitride products and products bonded with silicon nitride in which the silicon nitride is formed by conversion of silicon powder to silicon nitride during manufacture of the body, and wherein a catalyst is used for promoting the conversion of the silicon to silicon nitride. From ½ to 5 percent of a fluoride is employed to catalyze the conversion of silicon to silicon nitride.

U.S. Pat. No. 2,636,828 discloses compositions and articles composed essentially of oxidic material bonded by silicon nitride formed by conversion of silicon to silicon nitride during manufacture of the material or article in which the rate of conversion of silicon to silicon nitride is increased by adding a small percentage of iron powder.

U.S. Pat. No. 3,206,318 describes the manufacture of refractory articles having silicon nitride sinters as their principle component. The raw batch used in the manufacture of such articles contains a nitriding catalyst, e.g. metallic vanadium, $V_2O_5$ and $NH_4VO_3$. The addition of a fine powder of silicon carbide is taught to increase the resistance to oxidation of the resulting refractory article.

U.S. Pat. No. 3,222,438 describes the manufacture of self-bonded silicon nitride articles having a dispersion therein of fine silicon carbide from a compacted powdered mixture containing 90–95 percent by weight silicon and 10–5 percent by weight finely divided silicon carbide of a particle size of about 400 B.S. mesh.

U.S. Pat. No. 3,926,857 describes an electrically conducting material produced by nitriding a mixture of silicon and a component capable of being converted to an electrically conducting phase under the conditions of nitriding, e.g. colloidal graphite which is converted to silicon carbide during the nitriding step. The silicon carbide content of the resultant article is not greater than 37 percent by weight.

U.S. Pat. No. 3,991,166 describes a ceramic material which includes at least 90 percent of a single phase silicon aluminum oxynitride (si-al-o-n) and its manufacture. One method of manufacture involves sintering a mixture of not more than 75 percent by weight of high active surface area, alumina powder of a particle size less than 10 microns and silicon nitride powder of particle size less than 20 microns. In another method, a mixture of silicon and alumina powders of particle size less 20 microns is nitrided at a temperature between 1250° and 1600° C. The atomic ratio of silicon to aluminum is not less than 1 to 3 and preferably less than 3 to 1.

U.S. Pat. No. 4,038,092 describes a reaction-sintered silicon nitride body whose strength is substantially increased by impregnating its surface with finely divided alumina and thereafter firing the body in a nitrogen atmosphere having an appreciable partial pressure of SiO.

U.S. Pat. No. 4,113,503 describes a method of forming ceramic material including at least 90 percent by weight of single phase silicon aluminum oxynitride which has a crystal structure based on beta silicon nitride but of increased cell dimensions. In the method described in this reference a ceramic intermediary is produced which contains a silicon aluminum oxynitride which obeys a different formula from that of the final product. The intermediate may be made from a mixture consisting of silicon powder, aluminum powder, and alumina powder which is nitrided at an elevated temperature.

U.S. Pat. No. 4,127,630 describes a form of reaction-bonded silicon nitride and its process of manufacture, the product being characterized by isotropic structure, extremely small pore and grain size, high strength and a high ratio of alpha silicon nitride to beta silicon nitride. The silicon employed as a starting material has a maximum particle size of 10 microns, and an average particle size of the order of 2 microns or less. This fine silicon powder is pressed and thereafter sintered in an inert gas atmosphere such as argon and thereafter the bonded product is machined and thereafter nitrided in accordance with standard procedures.

U.S. Pat. No. 4,184,884 describes a process for producing a metastable precursor powder to be used in producing sialon. The process includes a controlled nitriding step using silicon, alumina, and either aluminum or aluminum nitride as starting materials. Aluminum, when used, is pretreated with nitrogen.

U.S. Pat. No. 4,243,621 describes a method of making beta-sialon sintered bodies. A pre-mix powder is formed of 20 to 80 weight percent silica powder and 80 to 20 percent aluminum powder. To this premix is added 10 to 1000 weight parts of metal silicon powder. To the above may be further added a refractory fine powder of alumina, silicon nitride, aluminim nitride, beta sialon, aluminum nitride polytype sialon or silicon carbide prior to molding. The resultant mixture is shaped into a green compact and thereafter sintered in a nitrogenous non-oxidative gas atmosphere.

U.S. Pat. No. 4,324,356 describes a process for joining silicon nitride based ceramic bodies by provision of an interface surface layer of metallic aluminum-based material to one or both of the bodies. Thereafter the bodies, which have been placed in physical contact with one another, are subjected to heating at 1400°–1900° C. for a period, typically of ½ to two hours, in a nitriding atmosphere to effect a chemical bond consisting of the conversion of the interfacing ceramic to a sialon.

U.S. Pat. No. 4,346,147 describes a method of manufacturing nitrided silicon parts which retain their mechanical properties after hot oxidation exposure. The method consists of mixing silicon powder with one to ten percent by weight of aluminum powder and thereafter sintering the mixture in a nitrogen rich atmosphere having closely controlled oxygen partial pressure. The sintered silicon nitride is subjected to a preliminary hot oxidation step under conditions such that the aluminum and oxygen supplied by the ambient atmosphere react with silica formed at the surface to form a surface layer of acicular mullite. The resulting articles are stated to be capable of withstanding simultaneously high temperature and an oxidizing atmosphere.

J. P. Torre and A. Mocellin at pages 1725–1733 of Volume 11 of the *Journal of Material Science* (1976) in an article entitled "Some Effects of Al and $O_2$ on the Nitridation of Silicon Compacts" describe the formation of beta sialons from compacts of silicon powder containing 6 weight percent of aluminum powder. Powders of at least 99 percent purity were employed.

J. M. Bauer et al. at page 32 of *Interceram*, Special Issue, Summer 1983, in an article entitled "New Solutions for Problem Areas of Blast Furnace Linings" state that sialon bonded silicon carbide is made by nitriding a mixture of silicon carbide, silicon metal and ultrafine alumina ($Al_2O_3$). Only one example is provided; the nature and composition of the bonding phase(s) is not detailed.

SUMMARY OF THE INVENTION

This invention provides a bonded silicon carbide article consisting essentially of granular silicon carbide and a bond comprising $Si_3N_4$ modified by the presence of oxygen and aluminum. The resulting sintered article has resistance to at least one of molten alkali attack and sequential steam oxidation and molten alkali attack that is materially in excess of that possessed by a similar article in which the $Si_3N_4$ bond is not modified by the presence of oxygen and aluminum.

This invention also provides a method for the manufacture of a bonded silicon carbide article consisting essentially of granular silicon carbide in a bond phase. The process includes forming a uniform plastic mixture comprising from about 4 to about 8 percent aluminum powder, and from about 10 to about 16 percent silicon powder with granular silicon carbide and water and, optionally, processing aids and temporary binders, e.g. dry lignone and bentonite; shaping the mixture into a green compact in the form of an article; drying the shaped mixture; and firing the green compact in a nitrogenous, non-oxidative atmosphere until substantially all of the silicon and aluminum is combined with nitrogen to complete formation of said article. The oxygen needed to form Si—Al—O—N is derived from surface oxygen contained on the silicon and silicon carbide powders.

This invention also provides a raw batch to be used in the manufacture of a bonded silicon carbide article having a bond comprising $Si_3N_4$ modified by the presence of oxygen and aluminum to form Si—Al—O—N. The raw batch comprises granular silicon carbide; silicon powder of fine particle size; and aluminum powder of fine particle size. Preferably the raw batch comprises from about 76 to about 88 percent granular silicon carbide; from about 10 to about 16 percent silicon; from about 4 to about 8 percent aluminum; about 0.5 percent bentonite clay; and from about 4 to about 4½ percent dry lignone.

DETAILED DESCRIPTION

All percents, fractions and ratios given in this specification and its claims are on a weight basis unless otherwise specifically indicated.

Compositions according to the invention and articles to be made therefrom are produced from the following ingredients: silicon carbide grain, granular silicon metal, aluminum powder, and temporary binders, such as bentonite clay and dry lignone.

The silicon carbide grain used in the examples provided herein was obtained from Electro Minerals Division of the Carborundum Company, Niagara Falls, N.Y. This silicon carbide grain has the following chemical specification:

SiC: 97 percent minimum
Fe: 0.25 percent maximum
Al: 0.25 percent maximum
Free C: 0.75 percent maximum
Surface Si: 0.90 percent maximum
$SiO_2$: 1.90 percent maximum This silicon carbide grain is crushed and graded into various size fractions. In the manufacture of refractory articles deemed to be highly suitable for blase furnace linings, the particle size of silicon carbide typically ranges from particles as large as 6 mesh to those finer than 70 mesh. The $SiO_2$ is believed to exist predominantly in the form of a film on the outer surface of the SiC grains; thus it is expected that smaller particles will have a higher $SiO_2$ content.

The silicon metal grain utilized in the examples provided herein was obtained from Elken Metals of Marietta, Ohio. This silicon metal grain has the following specification:

Si: 98 percent minimum
Fe: 1 percent maximum
Ca: 0.07 percent maximum
Cr: 0.10 percent maximum This silicon metal has a particle size of less than 200 mesh. While no oxygen specification is provided by the manufacturer, it is believed that the surface of the silicon metal grain oxidizes upon exposure to the atmosphere at ambient temperatures. The measured oxygen content of a sample of minus 200 mesh silicon metal grain was 0.64 percent.

A suitable aluminum powder is that available from J. T. Baker Chemicals Company, Phillipsburg, N.J. having the following chemical specification:

Al: 95 percent minimum
Fe: 0.1 percent maximum
As: 0.001 percent maximum
Alkaline and alkaline-earth metals: 0.5 percent maximum At least 95 percent of this aluminum powder has a particle size of less than 325 mesh U.S. Standard Sieve (40 microns). It is believed that aluminum powder having particle size of 150 mesh or finer can be used.

The bentonite clay used as a temporary binder has the following typical analysis:
  $SiO_2$: 68.44 percent
  $Al_2O_3$: 17.73 percent
  $Fe_2O_3$: 2.57 percent
  $TiO_2$: 0.38 percent
  CaO: 1.30 percent
  MgO: 0.70 percent
  $K_2O$: 0.45 percent
  $Na_2O$: 2.60 percent This clay is supplied in dried form and has a particle size of less than 200 mesh U.S. Standard sieve.

Dry lignone is also employed as a temporary binder. Suitable material is available from International Paper Company, New York, NY and has a typical dry analysis of:
  Volatile acids: 3.9 percent
  Total S: 4.1 percent
  Free $SO_2$: 0.2 percent
  $SO_3$: 0.9 percent
  sulfone $SO_2$: 5.5 percent
  CaO: 4.9 percent
  Fe: 0.02 percent
  MgO: 1.5 percent
  $Na_2O$: 0.3 percent
  $SiO_2$: 0.16 percent The remainder of the lignone is organic material. The lignone is supplied dry and has a particle size such that 95 weight percent will pass through a 100 mesh U.S. Standard sieve. The dry lignone may be mixed at the rate of 350 lbs/1 gal of number two fuel oil before using to facilitate the forming process.

The SiC powder is believed to contain a very thin oxide film. The amount of oxygen contained in this film is believed to be 0.3 to 1.0 percent by weight of the silicon carbide. While the bentonite analysis given indicates a high percentage of $SiO_2$, most of this is chemically tied with $Al_2O_3$ in the form of mullite ($2SiO_2.Al_2O_3$). Quantitative x-ray diffraction analysis indicates that quartz ($SiO_2$) is about 9 to 13 percent by weight of the bentonite.

In order to obtain satisfactory conversion of the silicon to silicon nitride/sialon within a reasonable period of time when a commercial grade of silicon carbide of the type above described is used, the silicon should be of a particle size fine enough to pass through a screen of 200 mesh U.S. Standard sieve (70–90 microns particle size) or finer. More rapid nitridation is obtained when the silicon is of a particle size in the neighborhood of 20 microns or less. The molar ratio of silicon powder to aluminum powder (Si/Al) should be from about 1.3 to about 4.0. The desired amount of aluminum further corresponds to about 4 to about 8 weight percent of aluminum based on the combined dry weight of silicon, aluminum and silicon carbide. If less than about 4 percent aluminum is employed, the resultant refractory material does not exhibit sufficient resistance to oxidation and molten alkali attack. If more than about 8 percent aluminum by weight of raw batch is employed, it is expected that aluminum nitride (AlN) would be formed, which is water soluble and therefore readily attacked upon exposure to steam oxidation.

The amount of bond phase present affects the performance of refractory articles according to the invention. Articles having an insufficient amount of bond phase are more susceptible to oxidative attack. Articles having an excessive amount of bond phase are more susceptible to alkali attack. It is desired that the amount of bond phase be from about fifteen to twenty-five percent of the entire weight of an article. This range can be achieved by using from about 10 to about 16 percent silicon metal powder in the raw batch.

"Fine" as the term is used herein with respect to particle size means a particle size of 200 mesh U.S. Standard sieve or finer. Although it is believed possible that the desired results may be obtained when using larger (silicon and aluminum) particle sizes, performance of such is not thought to be reliable.

In the preparation of a raw batch the ingredients are dry mixed thoroughly to assure homogeneous dry mix. Thereafter, a small amount of water is added, and wet mixing continues for several minutes to assure homogeneity of the resulting wet mix. The amount of water is such that, subsequent to mixing, the wet, raw batch is in the form of thick, plastic paste which can be formed into a ball by a human hand. The amount of water employed is about 2.8 percent by weight of the dry ingredients.

Subsequent to mixing, as just described the wet mixture is shaped into a green compact in the form of the desired article. This is preferably done by placing the requisite amount of mix into a mold and thereafter pressing the mixture at high pressure. Preferably the applied pressure is at least 3.5 tons per square inch (TPI), although lower pressures are believed to be operable. Thereafter the shaped green compact is fired in a nitrogen donating atmosphere until substantially all of the silicon and aluminum is combined with nitrogen. This latter step may be referred to as reaction sintering.

Firing of the green compact is accomplished in a non-oxidative, nitrogenous atmosphere. The firing may be done in a retort made of refractory material which is introduced into a periodic gas-fired kiln. Nitrogen is introduced continuously into the retort as the shaped mixture is heated to nitriding temperature. Alternatively, reaction sintering may be conducted in a tunnel kiln if care is taken to maintain the nitrogen atmosphere throughout the cycle. A nitriding temperature should be in excess of 1300° C. to achieve a commercially practical rate of reaction. The temperature should not exceed about 1600° C. to avoid decomposition of bond phase being formed. Preferably, nitriding is conducted at a temperature of about 1420° C. When the preferred temperature is employed, nitriding is generally accomplished in about 4 to 6 hours although a longer period, e.g. 12 hours is recommended to assure complete reaction and annealing of the article being formed. After nitriding is complete, the article is allowed to cool slowly to prevent thermal shock. Typically a cooling period of one and one-half days is employed and the article is maintained under a non-oxidative, nitrogenous atmosphere during cooling. Upon cooling, formation of the article is complete.

Organic materials are removed by subjecting the green compact to an inert, non-oxidative gas at an elevated temperature below that at which reaction sintering occurs. Organic binder removal may be accomplished at temperatures of between 350° and 650° C. It is preferred to not subject the green compact to an oxidizing step prior to reaction sintering so as to avoid excessive oxidation of the silicon and aluminum powders.

Suitable non-oxidative, nitrogenous atmospheres include single nitrogen gas and mixed nitrogen gas containing an inert gas, such as argon or neon, or hydrogen or ammonia.

The resulting articles have modified silicon nitride bond phase which contains from about 1½ to about 6½ percent oxygen and from about 6 to about 20 percent aluminum. A majority of the bond phase appears to be a beta Si—Al—O—N. Preferably, from about 50 to about 80 weight percent of the bond phase is Si—Al—O—N. The remainder of the bond phase is believed to be $Si_3N_4$ containing aluminum in solid solution.

The resultant article has an original modulus of rupture at 75° F. of at least 5000 psi prior to exposure to molten $K_2CO_3$ for six hours at 1700° F. Subsequent to such exposure, preferred embodiments exhibit a modulus of rupture not less than 90 percent of original modulus. The resultant article is also very resistant to exposure to steam at an elevated temperature. For example, articles to the invention are highly resistant to sequential exposure to steam oxidation and molten alkali. Articles according to preferred embodiments of the invention exhibit a weight loss not exceeding 10 percent upon sequential exposure to steam for 500 hours and 1100° C. at one atmosphere pressure followed by exposure to $K_2CO_3$ at 1700° F. for six hours. Articles according to preferred embodiments of the invention exhibit a volume expansion not exceeding 10 percent upon exposure to steam for 500 hours at 1100° C. at one atmosphere pressure.

The invention will now be further described by way of specific examples.

EXAMPLES 1-7

The ingredients shown in Table I were combined in the proportions given therein. For each raw batch the ingredients were dry mixed for two minutes with the blades of the Eirich mixer rotating in one direction followed by two minutes with the blades rotating in the opposite direction. Thereafter the indicated amount of water was added and wet mixing proceeded for about seven minutes with alternating directional movement of the blades. The resulting uniform damp raw batch for each example was pressed into 6 inch by 4¼ inch by 2½ inch bricks in a hydraulic press. A force of 260 tons was applied to a 16 inch diameter ram thereby resulting in a pressure of 6 tons per square inch being applied during formation of each brick. The bricks were thereafter dried by forced heated air. The pressed (wet) green density and dry green density for each green compact of the Examples 1 to 4 is indicated in Table II. The values reported represent the average of several bricks per example.

The dried bricks were thereafter set in a retort made of refractory material. The retort was introduced into a periodic gas-fired kiln. Nitrogen was introduced continually into the retort via four nitrogen lines, each of which delivered 450 cubic feet of nitrogen per hour. The volume of the retort was 82 cubic feet. Temperature was increased at a rate of 60° C. per hour up to 1000° C., and thereafter at a rate of 42° C. per hour up to the nitriding soak temperature of 1420° C. The bricks were maintained at this temperature (1420° C.) for 12 hours. Thereafter, the kiln was allowed to cool through a period of 1½ days. A nitrogen atmosphere was maintained during the cooling period. The procedure followed for preparation of Examples 5-7 was similar to that of Examples 1-4.

TABLE I

| MIX FORMATIONS (PARTS BY WEIGHT) (RAW BATCH COMPOSITION) | | | | |
|---|---|---|---|---|
| Example No. | 1 | 2 | 3 | 4 |
| SiC grain: | | | | |
| 6-10 mesh | 69 | 69 | 73 | 73 |
| 10-18 mesh | 100 | 100 | 104 | 104 |
| 18-34 mesh | 139 | 139 | 146 | 146 |
| 34-70 mesh | 108 | 108 | 113 | 113 |
| 70 mesh and finer | 105 | 105 | 110 | 110 |
| Silicion (200 mesh & finer) | 87 | 87 | 62 | 62 |
| Bentonite Clay | 3.1 | 3.1 | 3.1 | 3.1 |
| Dry lignone | 28 | 28 | 28 | 28 |
| Aluminum Powder (95 percent <40 micron) | — | 31 | — | 18.6 |
| Water | 17.4 | 17.4 | 17.4 | 17.4 |

TABLE II

| UNFIRED (GREEN) DENSITY VALUES | | | |
|---|---|---|---|
| Example No. | | Pressed (wet) Green Density (g/cc) | Dried Green Density (g/cc) |
| 1 | (14% Si) | 2.60 | 2.50 |
| 2 | (14% Si + 5% Al) | 2.54 | 2.44 |
| 3 | (10% Si) | 2.63 | 2.54 |
| 4 | (10% Si + 3% Al) | 2.61 | 2.51 |
| 5 | (14% Si + 2.5% Al) | 2.43 | 2.49 |
| 6 | (14% Si + 7.5% Al) | 2.52 | 2.48 |
| 7 | (14% Si + 10.0% Al) | 2.50 | 2.47 |

The properties of the resulting bricks produced from the raw batch of each of the Examples 1-7 are given in Table III.

TABLE III

| Example No. | 1 | 2 | 3 | 4 | 5 | 6 | 7 |
|---|---|---|---|---|---|---|---|
| Bulk Density (g/cc) | 2.66 | 2.68 | 2.65 | 2.66 | 2.62 | 2.63 | 2.58 |
| Apparent Porosity (%) | 15.1 | 13.8 | 16.4 | 15.3 | 16.2 | 11.2 | 10.4 |
| Apparent Specific Gravity | 3.13 | 3.11 | 3.16 | 3.14 | — | — | — |
| Original Cold MOR (psi) | 5583 | 5754 | 5195 | 5336 | 5149 | 6127 | 5331 |
| Original MOR at 1350° C. (psi) | 5968 | 6507 | 6503 | 5311 | 4034 | 4629 | 2902 |

In order to generate the data given in Table III, a population of several bricks per each raw batch was selected. Each brick was cut into bars of 6 inches by 1 inch by 1 inch. Bulk density, apparent porosity and apparent specific gravity were measured on 3 bars per brick, and the results reported in Table III are averages. Example 1 represents a composition like that described in U.S. Pat. No. 2,752,258. This product is commercially available from the Carborundum Company, Refractories Division, Niagara Falls, NY under the trademark REFRAX 20. The composition represented by Example 2 is according to the invention that can be seen for examination of the formulations given in Table I. This Example 2 corresponds in composition to that Example 1 except for the addition of about 5 weight percent of aluminum powder based on the total weight of the raw batch excluding water. Example 3 has a composition similar to that of Example 1, but includes a lower bond phase content. Example 3 is included to serve as a reference material for Example 4. Example 4 has a bond phase amount and composition similar to that of Example 3 except for the addition of about 3 weight percent of fine aluminum metal.

Example 5 is formed from a raw batch similar to Example 1 except for the addition of 2.5 weight percent fine aluminum metal. 1 Example 6 is formed from a raw batch similar to Example 1 except for the addition of 7.5 weight percent fine aluminum metal. Example 7 is formed from a raw batch similar to Example 1 except for the addition of 10 weight percent fine aluminum metal.

In Table IV are presented the results of testing for molten alkaline resistance. Several bars of each example taken from a multi-brick population of each example were tested and the results averaged. The values given in Table IV indicate a clear improvement of Examples 2 and 4 over the standard Example 1. For Examples 2 and 4, the weight change is positive. This is contrary to what normally occurs in silicon nitride bonded silicon carbide refractories as indicated by the weight loss experienced by Examples 1 and 3. The modulus of rupture (MOR) of Example 2 does not decrease after exposure of molten alkali as usually occurs with silicon carbide refractories. Rather the MOR of Examples 2 and 7 increased slightly while that of Examples 3, 4, 5 and 6 decreased slightly. Examination of the data given in Table IV indicates that Example 2 exhibits the best resistance among these examples to molten alkali attack. A comparison of Examples 1 and 3 indicates the influence of the amount of $Si_3N_4$ bond phase.

TABLE IV

| | (MOLTEN ALKALINE RESISTANCE) | | | | | | |
|---|---|---|---|---|---|---|---|
| Example No. | 1 | 2 | 3 | 4 | 5 | 6 | 7 |
| Weight Change (%) | −4.23 | +0.70 | −1.53 | +0.42 | +0.30 | +0.70 | +1.18 |
| Cold MOR after (psi) | 4358 | 6051 | 4684 | 4981 | 4802 | 4936 | 5428 |
| Cold MOR change (%) | −22 | +5 | −9 | −7 | −7 | −10 | +2 |

The alkali resistance test results reported herein were obtained using the following procedure: A plurality of bars of 1 inch by 1 inch by 6 inch dimension are cut from a refractory brick. Before exposure to alkali, the following properties are measured: bulk density, porosity, specific gravity, modulus of elasticity and/or sonic velocity and cold, i.e. room temperature MOR. Subsequent to exposure the weight and volume change of the samples are noted as well as modulus of elasticity (MOE) and modulus of rupture at room temperature (Cold MOR). The bars are dried to constant weight at the beginning of testing. The bars are placed on graphite spacers positioned in the bottom of clean stainless steel trays. Each bar is buried in technical grade $K_2CO_3$ and coke breeze. A stainless steel muffle furnace is provided with a layer of coke breeze in its bottom, which is leveled and tamped. Thereafter, the trays are placed on the coke breeze. A layer of coke breeze is provided over each sample-containing tray. The muffle is placed in a kiln which is heated at 350° F. per hour until a soaking temperature of 1700° F. is achieved. Thereafter, the samples are soaked for 3 hours at 1700° F. Thereafter the samples are cooled overnight. Thereafter this thermal cycle is repeated. At the end of the second cycle the kiln is allowed to cool and is then opened. The samples are removed, and washed in warm water, e.g. 105° F. to loosen the bars from the potassium carbonate. The bars are thereafter placed in flowing water and allowed to leach for 24 hours. Thereafter the bars are dried at 300° F. prior to having their physical properties measured.

The superior properties of composition according to the present invention is also indicated in Table V, which lists the results of a sequential oxidation + alkali test. In this test 6 inch by 1 inch by 1 inch sample bars are prepared as in the case of the alkali resistance test hereinbefore described. These sample bars are exposed to the steam atmosphere for 500° hours at 1100° C. at one atmosphere pressure. Subsequently, these bars are subjected to the molten/vapor alkali test described herein above. The data given in Table V indicates that Example 2 undergoes less than ⅓ the amount of weight loss experienced by Examples 1, 3 and 4. It is to be noted that competitive materials bonded by silicon nitride also lose about 30 weight percent when subjected to this sequential test. Granular silicon carbide refractories which are bonded with beta silicon carbide are typically completely destroyed when subjected to this test.

TABLE V

| | (SEQUENTIAL OXIDATION PLUS ALKALINE RESISTANCE) | | | |
|---|---|---|---|---|
| Example No. | 1 | 2 | 3 | 4 |
| Weight Change (%) | −29.93 | −8.26 | −33.24 | −33.62 |
| Cold MOR after sequential attack (psi) | 4668 | 4390 | 3771 | 2281 |
| Cold MOR change (%) | −18 | −24 | −27 | −57 |

In Table VI are presented the results of testing for steam oxidation resistance. The sample bars were exposed to steam for 500 hours at 1100° C. at one atmosphere pressure. While Example 1 demonstrates the greatest resistance, this property should not be considered alone as previously stated. It appears that the addition of insufficient amounts of aluminum metal powder to the raw batch greatly reduces steam oxidation resistance (compare Example 5 with Examples 2 and 6). The addition of too much aluminum metal powder also considerably reduces steam oxidation resistance (compare Example 7 with Examples 2 and 6). The results reported in Table VI also reveal that substantial variations can occur within a given brick. Bars cut from the corners of the brick exhibited considerably different values from those taken from the center of the brick in Example 7. Examples 2 and 6 are preferred embodiments within the present invention.

TABLE VI

| (STEAM OXIDATION RESISTANCE) | | | | | |
|---|---|---|---|---|---|
| Example No. | 1 | 5 | 2 | 6 | 7 |
| Percent Al | 0 | 2.5 | 5.0 | 7.5 | 10 |
| Corner bars | | | | | |
| Avg vol (%) change | 0.6 | 29.0 | 6.2 | 4.6 | 8.2 |
| Avg wt (%) change | 3.3 | 12.1 | 5.1 | 7.0 | 8.6 |
| Internal bars | | | | | |
| Avg vol (%) change | 0.4 | 31.6 | 5.7 | 7.9 | 17.4 |
| Avg wt (%) change | 3.1 | 12.3 | 4.4 | 9.2 | 12.2 |
| Total population | | | | | |
| Avg vol (%) change | 0.5 | 30.3 | 5.9 | 6.2 | 13.0 |
| Avg wt (%) change | 3.2 | 12.2 | 4.7 | 8.1 | 10.4 |

The values given in the accompanying Tables III, IV and V for modulus of rupture (MOR) were determined utilizing a three-point bending apparatus in accordance with ASTM procedure C 133-55 utilizing a sample size of 6 inches by 1 inch by 1 inch. It is to be noted that a tradeoff appears to exist between oxidation resistance and alkali resistance in silicon nitride-bonded silicon carbide refractories. Generally speaking, when the formulation is adjusted to increase alkali resistance, the resulting composition exhibits lower steam oxidation resistance. A practical consequence of this is as alkali weight loss is reduced, volume expansion increases. For Example 1 loss upon alkali exposure is about 4 percent, whereas for Example 2 no weight loss is encountered. However, for Example 1 the volume expansion is less than 1 percent upon steam oxidation whereas, for Example 2 volume expansion is about 6 percent upon steam oxidation. Excessive expansion upon exposure to steam oxidation conditions generates problems such as swelling and cracking when bricks of such material are employed to line the interior of a blast furnace. Also, the oxidized bricks are more generally susceptible to thermal shock damage and molten alkali attack. In such an application it is believed that good oxidation resistance is second only to resistance to alkali attack.

The compositions, raw batches and methods of this invention do not intentionally include the incorporation of silica powder as an ingredient of the raw batch, although small amounts may be present as an impurity associated with the silicon metal or silicon carbide. The addition of silica ($SiO_2$) may result in formation of $Si-O_2-Al_2O_3$ glass that is susceptible to attack by the alkali conditions encountered in a blast furnace. Material according to the present invention and articles made therefrom are eminently suited for use in the severe wear areas of a blast furnace lining where severe chemical aggression (alkali attack and oxidation) may occur. These areas include the bosh, belly, mantle and lower and middle stack.

It is believed that granular refractory material, such as alumina, silicon nitride, aluminum nitride, beta-sialon, or other sialons may be substituted or provided in addition to the granular silicon carbide. In preferred embodiments the bond phase comprises from about 15 to 25 percent of the total weight of the resulting refractory article after nitriding.

What is claimed is:

1. A bonded silicon carbide article consisting essentially of granular silicon carbide and a bond phase, said article being made by a process consisting essentially of:
   (a) forming a uniform mixture consisting essentially of from about 4 to about 8 percent aluminum powder, from about 10 to about 16 percent silicon powder and the remainder being granular silicon carbide and optionally, a temporary binder;
   (b) shaping the mixture into a green compact in the form of the article;
   (c) firing the green compact in a non-oxidative nitrogeneous atmosphere at a temperature in excess of 1300° C. until substantially all of the silicon and aluminum is combined with nitrogen to complete formation of the article;
wherein the bond phase comprises from about 50 to 80 weight percent Si—Al—O—N, and contains from about 1½ to about 6½ weight percent oxygen based on the total weight of bond phase, and from about 6 to about 20 weight percent aluminum based on the total weight of bond phase.

2. The article of claim 1 wherein the bond phase is about 70 weight percent beta Si—Al—O—N.

3. The article of claim 1 wherein said article has an original modulus of rupture at 75° F. of at least about 5000 psi prior to exposure to molten $K_2CO_3$ for 6 hours at 1700° F. and its modulus of rupture subsequent to such exposure is not less than 90 percent of its original modulus.

4. The article of claim 3, wherein said article exhibits a weight loss not exceeding 10 percent upon exposure to steam for 500 hours at 1100° C. at about 1 atmosphere pressure followed by exposure to $K_2CO_3$ to 1700° F. for 6 hours.

5. The article of claim 4, wherein said article exhibits a volume expansion not exceeding 10 percent upon exposure to steam for about 500 hours at 1100° C. at about 1 atmosphere pressure.

6. A raw batch for the manufacture of a bonded silicon carbide article having a bond comprising $Si_3N_4$ modified by the presence of oxygen and aluminum to form Si—Al—O—N, said raw batch consisting essentially of:
   (a) from about 76 to about 88 weight percent granular silicon carbide;
   (b) from about 10 to about 16 weight percent fine silicon powder;
   (c) from about 4 to about 8 weight percent fine aluminum powder; and, based on the combined weight of the foregoing,
   (d) about one-half weight percent bentonite clay; and
   (e) from about 4 to about 5 weight percent dry lignone.

7. The raw batch of claim 6 wherein the silicon powder has a particle size of less than 200 mesh U.S. Standard sieve and the aluminum powder has a particle size of less than 325 mesh U.S. Standard sieve.

8. The raw batch of claim 6 wherein
   (a) about 30 weight percent of the silicon carbide is of 6-18 mesh particle size, about 45 weight percent is of 18-70 mesh particle size and about 20 percent is of 70 mesh and finer particle size; the silicon carbide has the following chemical specification:
   SiC: 97% minimum
   Fe: 0.25% maximum
   Al: 0.25% maximum
   Free C: 0.75% maximum
   Surface Si: 0.90% maximum
   $SiO_2$: 1.90% maximum
   (b) the silicon has the following chemical specification:
   Si: 98% minimum
   Fe: 1% maximum
   Ca: 0.07% maximum
   Cr: 0.10% maximum
   (c) the aluminum has the following chemical specification:
   Al: 95% minimum
   Fe: 0.1% maximum
   As: 0.001% maximum
   Alkaline and alkaline-earth metals: 0.5% maximum 9. A raw batch for the manufacture of a bonded silicon carbide article having a bond comprising $Si_3N_4$ modified by he presence of oxygen and aluminum to form Si—Al—O—N, said raw batch consisting essentially of:
   (a) granular silicon carbide;
   (b) fine silicon powder; and
   (c) fine aluminum powder;
wherein the weight ratio of the combined weight of silicon and aluminum to the combined weight of silicon, aluminum, and silicon carbide is from about 0.15 to about 0.25 and the molar ratio of silicon to aluminum is from about 1.3 to about 4.0.

10. A process for manufacturing a refractory article comprising the steps of:
(a) forming a raw batch consisting essentially of a mixture of from about 4 to about 8 weight percent aluminum powder with from about 10 to about 16 weight percent silicon powder and from about 76 to about 88 weight percent granular silicon carbide and, optionally, a temporary binder;
(b) shaping said raw batch into a green compact;
(c) reaction sintering the green compact in a nitrogeneous, non-oxidative gas atmosphere until substantially all of the silicon and aluminum combines with nitrogen to complete formation of the article.

11. The process of claim 10 wherein reaction sintering occurs at an atmospheric temperature in excess of 1300° C.

12. The process of claim 10 wherein the raw batch comprises silicon powder having a particle size of less than 200 mesh; aluminum powder 95 percent of which has a particle size of less than 325 mesh; the green compact has a density of at least 2.4 g/cc; and reaction sintering is conducted at a temperature of between 1350° and 1600° C.

13. The process of claim 12 wherein the green compact is placed in a kiln whose temperature is thereafter increased at a rate of about 60° C./hour from ambient to 1000° C. and thereafter at a rate of about 40° C./hour to 1420° C. and thereafter maintained at 1420° C. for at least about 6 hours and thereafter allowed to cool slowly.

14. The process of claim 10 further comprising drying the green compact and thereafter subjecting the green compact to flowing gas at a temperature of between 350° C. and 600° C. to remove any organic binder prior to reaction sintering.

15. The process of claim 10 wherein the raw batch contains sufficient oxygen which reacts upon sintering with the aluminum and silicon of the green compact and nitrogen from the sintering atmosphere to form beta Si—Al—O—N.

16. The process of claim 10 wherein the raw batch contains about 0.5 percent bentonite and about 4 percent lignone and sufficient water to form a plastic mixture.

17. The process of claim 16 wherein the raw batch is mixed dry prior to addition of the water.

* * * * *